US009344445B2

(12) United States Patent
Burns et al.

(10) Patent No.: US 9,344,445 B2
(45) Date of Patent: *May 17, 2016

(54) DETECTING MALICIOUS NETWORK SOFTWARE AGENTS

(71) Applicant: Juniper Networks, Inc., Sunnyvale, CA (US)

(72) Inventors: Bryan Burns, Portland, OR (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,133

(22) Filed: Dec. 15, 2014

(65) Prior Publication Data

US 2015/0106935 A1   Apr. 16, 2015

Related U.S. Application Data

(63) Continuation of application No. 12/432,325, filed on Apr. 29, 2009, now Pat. No. 8,914,878.

(51) Int. Cl.
*H04L 29/06* (2006.01)

(52) U.S. Cl.
CPC ............ *H04L 63/1441* (2013.01); *H04L 63/14* (2013.01); *H04L 63/1416* (2013.01); *H04L 2463/144* (2013.01)

(58) Field of Classification Search
CPC . H04L 63/14; H04L 63/1441; H04L 63/1416; H04L 2463/144
See application file for complete search history.

(56) References Cited

U.S. PATENT DOCUMENTS 6,219,706 B1    4/2001   Fan et al.
6,321,338 B1   11/2001   Porras et al.
(Continued)

FOREIGN PATENT DOCUMENTS

CN      1649346 A      8/2005
CN    101382979 A      3/2009
(Continued)

OTHER PUBLICATIONS

"Combating Bots and Mitigating DDoS Attacks," Juniper Networks, Inc., retrieved from internet http://www.fortguard.com/DDOS/351198.pdf, Apr. 2006, 8 pp.
(Continued)

*Primary Examiner* — Robert Leung
(74) *Attorney, Agent, or Firm* — Shumaker & Sieffert, P.A.

(57) ABSTRACT

This disclosure describes techniques for determining whether a network session originates from an automated software agent. In one example, a network device, such as a router, includes a network interface to receive packets of a network session, a bot detection module to calculate a plurality of scores for network session data based on a plurality of metrics, wherein each of the metrics corresponds to a characteristic of a network session originated by an automated software agent, to produce an aggregate score from an aggregate of the plurality of scores, and to determine that the network session is originated by an automated software agent when the aggregate score exceeds a threshold, and an attack detection module to perform a programmed response when the network session is determined to be originated by an automated software agent. Each score represents a likelihood that the network session is originated by an automated software agent.

19 Claims, 7 Drawing Sheets

(56) References Cited

U.S. PATENT DOCUMENTS

| | | | |
|---|---|---|---|
| 6,970,943 B1 | 11/2005 | Subramanian et al. | |
| 6,975,628 B2 | 12/2005 | Johnson et al. | |
| 7,162,740 B2 | 1/2007 | Eastlake, III | |
| 7,203,740 B1 | 4/2007 | Putzolu et al. | |
| 7,301,899 B2 | 11/2007 | Goldstone | |
| 7,362,763 B2 | 4/2008 | Wybenga et al. | |
| 7,496,955 B2 | 2/2009 | Akundi et al. | |
| 7,743,144 B1 | 6/2010 | Wright et al. | |
| 7,849,502 B1 | 12/2010 | Bloch et al. | |
| 8,112,800 B1 | 2/2012 | Yang et al. | |
| 8,209,756 B1 | 6/2012 | Guruswamy et al. | |
| 8,291,495 B1 | 10/2012 | Burns et al. | |
| 8,561,177 B1 | 10/2013 | Aziz et al. | |
| 8,789,173 B2 | 7/2014 | Narayanaswamy et al. | |
| 8,914,878 B2 | 12/2014 | Burns et al. | |
| 2002/0095492 A1 | 7/2002 | Kaashoek et al. | |
| 2002/0126621 A1 | 9/2002 | Johnson et al. | |
| 2002/0166063 A1 | 11/2002 | Lachman, III et al. | |
| 2003/0097557 A1 | 5/2003 | Tarquini et al. | |
| 2003/0110274 A1 | 6/2003 | Pazi et al. | |
| 2004/0015721 A1 | 1/2004 | Eastlake, III | |
| 2004/0044912 A1 | 3/2004 | Connary et al. | |
| 2004/0054925 A1 | 3/2004 | Etheridge et al. | |
| 2004/0107286 A1 | 6/2004 | Larson et al. | |
| 2004/0111635 A1 | 6/2004 | Boivie et al. | |
| 2004/0218532 A1 | 11/2004 | Khirman | |
| 2005/0039104 A1 | 2/2005 | Shah et al. | |
| 2005/0125195 A1 | 6/2005 | Brendel | |
| 2005/0144441 A1 | 6/2005 | Govindarajan | |
| 2005/0160289 A1 | 7/2005 | Shay | |
| 2006/0059550 A1 | 3/2006 | Kausik | |
| 2006/0075491 A1 | 4/2006 | Lyon | |
| 2006/0089994 A1 | 4/2006 | Hayes | |
| 2006/0136294 A1 | 6/2006 | Linden et al. | |
| 2006/0137009 A1 | 6/2006 | Chesla | |
| 2006/0185008 A1 | 8/2006 | Le et al. | |
| 2006/0288413 A1 | 12/2006 | Kubota | |
| 2007/0086336 A1 | 4/2007 | Richards et al. | |
| 2007/0107059 A1 | 5/2007 | Chasin et al. | |
| 2007/0118894 A1* | 5/2007 | Bhatia | 726/13 |
| 2007/0180511 A1 | 8/2007 | Eastlake, III | |
| 2007/0294369 A1 | 12/2007 | Ginter et al. | |
| 2008/0080518 A1 | 4/2008 | Hoeflin et al. | |
| 2008/0101234 A1 | 5/2008 | Nakil et al. | |
| 2008/0147847 A1 | 6/2008 | Pitkow et al. | |
| 2008/0270154 A1 | 10/2008 | Klots et al. | |
| 2008/0307526 A1 | 12/2008 | Chung et al. | |
| 2009/0064337 A1 | 3/2009 | Chien | |
| 2009/0172815 A1 | 7/2009 | Gu et al. | |
| 2009/0180391 A1 | 7/2009 | Petersen et al. | |
| 2009/0254989 A1 | 10/2009 | Achan et al. | |
| 2009/0265317 A1* | 10/2009 | Buehrer et al. | 707/3 |
| 2010/0082400 A1 | 4/2010 | Bagherjeiran et al. | |
| 2010/0262457 A1 | 10/2010 | House | |

FOREIGN PATENT DOCUMENTS

| | | |
|---|---|---|
| WO | WO 0221771 A1 | 3/2002 |
| WO | WO 2008002590 A2 | 1/2008 |
| WO | WO 2009064114 A2 | 5/2009 |

OTHER PUBLICATIONS

"IP Analyser: TCP Packet Field Descriptions," Analyser Sales Ltd., retrieved from internet www.ipanalyser.co.uk, updated Jul. 2003, copyright 2003, 2 pp.

"Well-Known TCP Port Number," Jupitermedia Corporation, retrieved from internet www.webopedia.com, last updated Mar. 2014, copyright 2004, 3 pp.

Bernstein, "SYN Cookies," retrieved from internet http://cr.yp.to/syncookies.html, Oct. 2003, 3 pp.

Egan, "Decomposition of a TCP Packet," www.passwall.com, Aug. 7, 2000, 4 pp.

Egan, "Sample TCP/IP Packet," www.passwall.com, Version 0.0.0@ 03:55/08.07.2000, Copyright 2002, 9 pp.

Gibbs, "A Guide to Original SYN," www.nwfusion.com, Network World, Nov. 2000, 2 pp.

Lemon, "Resisting SYN Flood DoS Attacks with a SYN Cache," retrieved from internet http://people.freebsd.org/~jlemon/papers/syncache.pdf, Mar. 11, 2015, 9 pp., BSDCon vol. 2002.

Mahoney, "Network Traffic Anomaly Detection Based on Packey Bytes," SAC 2003, ACM, Mar. 2003, 5 pp.

Mirkovic, "D-Ward: Source-End Defense Against Distributed Denial-of-Service Attacks," Chapter 6 "D-Ward," Dissertation Paper, University of California, Los Angeles, 2003, 51 pp.

Nottingham, et al. "HTTP Header Field Registrations," Network Working Group, rfc 4229, Informational, Dec. 2005, 54 pp.

Ranjan et al, "DDoS-shield: DDoS-resilient scheduling to counter application layer attacks." IEEE/ACM Transactions on Networking, TON, vol. 17(1), Feb. 2009, pp. 26-39.

Siris et al., "Application of anomaly detection algorithms for detecting SYN flooding attacks," Computer Communications, vol. 29(9), May 2006, pp. 1433-1442.

Staniford et al., "Practical Automated Detection of Stealthy Portscans," Journal of Computer Security, vol. 10(1/2), 2002, 16 pp.

Wang et al., "Detecting SYN Flooding Attacks," Proc. Infocom, 2002, 10 pp.

Xie et al., "A novel model for detecting application layer DDoS attacks," IEEE Proceedings of the First International Multi-Symposiums on Computer and Computational Sciences, vol. 2., Jun. 2006, 8 pp.

Xie, Yi, and Shun-Zheng Yu. "Monitoring the application-layer DDoS attacks for popular websites." Networking, IEEE/AcM Transactions on 17.1 (Feb. 19, 2009): 15-25.

Yu et al., "A detection and offense mechanism to defend against application layer DDoS attacks," IEEE Third International Conference on Networking and Services, ICNS, Jun. 2007, 6 pp.

Search Report from Counterpart European Patent Application No. 10156048, dated May 28, 2014, 2 pp.

Search Opinion from Counterpart European Patent Application No. 10156048, dated Jun. 6, 2014, 2 pp.

Notification of the Decision of Rejection, and translation thereof, from Counterpart Chinese Patent Application No. 201010170922.9, dated Mar. 31, 2014, 18 pp.

Notification of the Third Office Action, and translation thereof, from Counterpart Chinese Patent Application No. 201010170922.9, dated Sep. 2, 2013, 9 pp.

Notification of the Second Office Action, and translation thereof, from Counterpart Chinese Patent Application No. 201010170922.9, dated Mar. 27, 2013, 12 pp.

Notification of the First Office Action, and translation thereof, from Counterpart Chinese Patent Application No. 201010170922.9, dated Aug. 16, 2012, 16 pp.

Search Report, and translation thereof, from Chinese Patent Application No. 201010170922.9, dated Jul. 27, 2012, 2 pp.

Prosecution History from U.S. Appl. No. 12/432,325, dated Nov. 23, 2011 through Aug. 11, 2014, 145 pp.

* cited by examiner

DETECTING MALICIOUS NETWORK SOFTWARE AGENTS

PRIORITY CLAIM

This application is a continuation of U.S. application Ser. No. 12/432,325, filed Apr. 29, 2009, the entire content of which is incorporated herein by reference.

TECHNICAL FIELD

This disclosure relates to computer networks and, more particularly, to detection of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, an intrusion detection system ("IDS") applies regular expressions or sub-string matches to detect defined patterns within a data stream. Multiple patterns may be used in an attempt to improve the accuracy of the attack detection. In order to improve the probability of detecting an attack, the IDS may attempt to identify the type of software application and protocol associated with the data stream. Based on the identification, the IDS selects the appropriate patterns to apply in order to detect a network attack, which is used herein to include viruses or other malicious activity.

Malicious users implement network attacks at various layers of the Open Systems Interconnection (OSI) reference model. For example, denial of service (DoS) attacks have been implemented historically at layer three (network layer) or layer four (transport layer) of the OSI model, such as SYN flood attacks, where an attacker bombards a network server with synchronization (SYN) packets, which may result in an overflow in the number of open connections for the server. Similar attacks include ACK floods and reset (RST) attacks.

Malicious users have recently developed network attacks at layer seven (application layer) of the OSI model. As one example, DoS attacks at the application layer may continually issue requests that consume a large amount of a web server's resources. For example, layer seven DoS attacks include repetitive issuing of database queries to the server. Other malicious network sessions at the application layer include "click fraud," where an automated device or script repeatedly selects a particular ad-based link of a web page. Owners of web pages that display ad-based links receive revenue for each instance that the link is selected, thus automating selection of the link may be fraudulent. Another malicious network session at the application layer relates to e-mailing scripts that send spam e-mails to as many recipients as possible.

To implement these attacks, some malicious users write programs (i.e., malicious software agents) that are intended to be executed on one or more other users' computers. Malicious users may write viruses, trojans, worms, or other malicious programs that implement these various attacks and that spread to many different computers. A malicious program may act as a "bot" that executes a script or other automated program to execute a network attack or perform other malicious activity at the application layer. A group of computing devices infected with the same malicious program, referred to as a "bot net," may coordinate a network attack or malicious action against a common target at the application layer. Conventional IDS devices are not able to detect or react to software agents that implement these application-layer attacks.

SUMMARY

In general, this disclosure describes techniques for detecting automated software agents that perform malicious attacks or other actions. The techniques generally include analyzing protocols utilized within a network session (e.g., layer three through layer seven protocols) to compute metrics for the particular network session and determining whether the session is representative of to a normal user's behavior or a malicious automated software agent. For example, an intrusion detection system (IDS) or an intrusion detection and prevention (IDP) device examines traffic of a particular network session and calculates scores for a plurality of different metrics. The metrics may, for example, relate to a characteristic typically indicative of a malicious network session. Various combinations of the metrics are used to determine a probability that the network session is originated by a malicious network software agent. The IDP device may therefore calculate an aggregate score for the metrics and determine that a network session is malicious when the aggregate score exceeds a threshold.

In one example, a router or other network device includes a service plane component (e.g., removable card) that performs the techniques described in this disclosure. The service plane card may be inserted into a multi-chassis network device to equip the multi-chassis network device to perform these techniques. For example, a router may include slots that may receive a service plane intrusion detection and prevention (IDP) card to perform the techniques of this disclosure.

In one example, a method includes receiving, with a network device, packets of a network session, assembling network session data for the network session from the packets, the network session data comprising application-layer data and packet flow data for the network session, calculating a plurality of scores for the network session based on a plurality of metrics applied to the network session data, wherein each of the metrics corresponds to a characteristic of a network session originated by an automated software agent, and wherein each of the scores represents a likelihood that the network session is originated by an automated software agent, aggregating the plurality of scores to produce an aggregate score, determining that the network session is originated by an automated software agent when the aggregate score exceeds a threshold, and executing a programmed response when the network session is determined to be originated by an automated software agent.

In another example, a network device includes a network interface to receive packets of a network session, a control unit having one or more processors, a reassembly module executing within the control unit to re-assemble application-layer data for the network session, a flow table to store packet flow information for the network session, a bot detection module executing within the control unit to calculate a plurality of scores for the network session based on a plurality of metrics each applied to at least one of the reassembled application-layer data and the packet flow information, wherein each of the metrics corresponds to a characteristic of a network session originated by an automated software agent, wherein the bot detection module is configured to produce an aggregate score from an aggregate of the plurality of scores, and to determine that the network session is originated by an automated software agent when the aggregate score exceeds a threshold, wherein each of the scores represents a likelihood that the network session is originated by an automated software agent, and an attack detection module executing within the control unit to perform a programmed response when the network session is determined to be originated by an automated software agent.

In another example, a computer-readable medium, such as a computer-readable storage medium, contains, e.g., is encoded with, instructions that cause a programmable processor to receive packets of a network session, assemble network session data for the network session from the packets, the network session data comprising application-layer data and packet flow data for the network session, calculate a plurality of scores for the network session based on a plurality of metrics applied to the network session data, wherein each of the metrics corresponds to a characteristic of a network session originated by an automated software agent, and wherein each of the scores represents a likelihood that the network session is originated by an automated software agent, aggregate the plurality of scores to produce an aggregate score, determine that the network session is originated by an automated software agent when the aggregate score exceeds a threshold, and execute a programmed response when the network session is determined to be originated by an automated software agent.

The techniques of this disclosure may provide several advantages. For example, the techniques enable real-time detection of automated software agents ("bots") by inspecting traffic and characterizing network sessions in real-time, rather than merely detecting bots' activity offline and after-the-fact. For example, the techniques of this disclosure may determine that a network session is originated by a malicious, automated software agent from various characteristics of the network session at various layers, including the application layer. Therefore, the techniques may be used to reduce or prevent the effects of malicious or otherwise unwanted network activity, such as denial of service (DoS) attacks, click fraud, e-mail spam bots, web crawling, or other unwanted network sessions in real time.

The details of one or more examples are set forth in the accompanying drawings and the description below. Other features, objects, and advantages will be apparent from the description and drawings, and from the claims.

DETAILED DESCRIPTION

Figure 1:
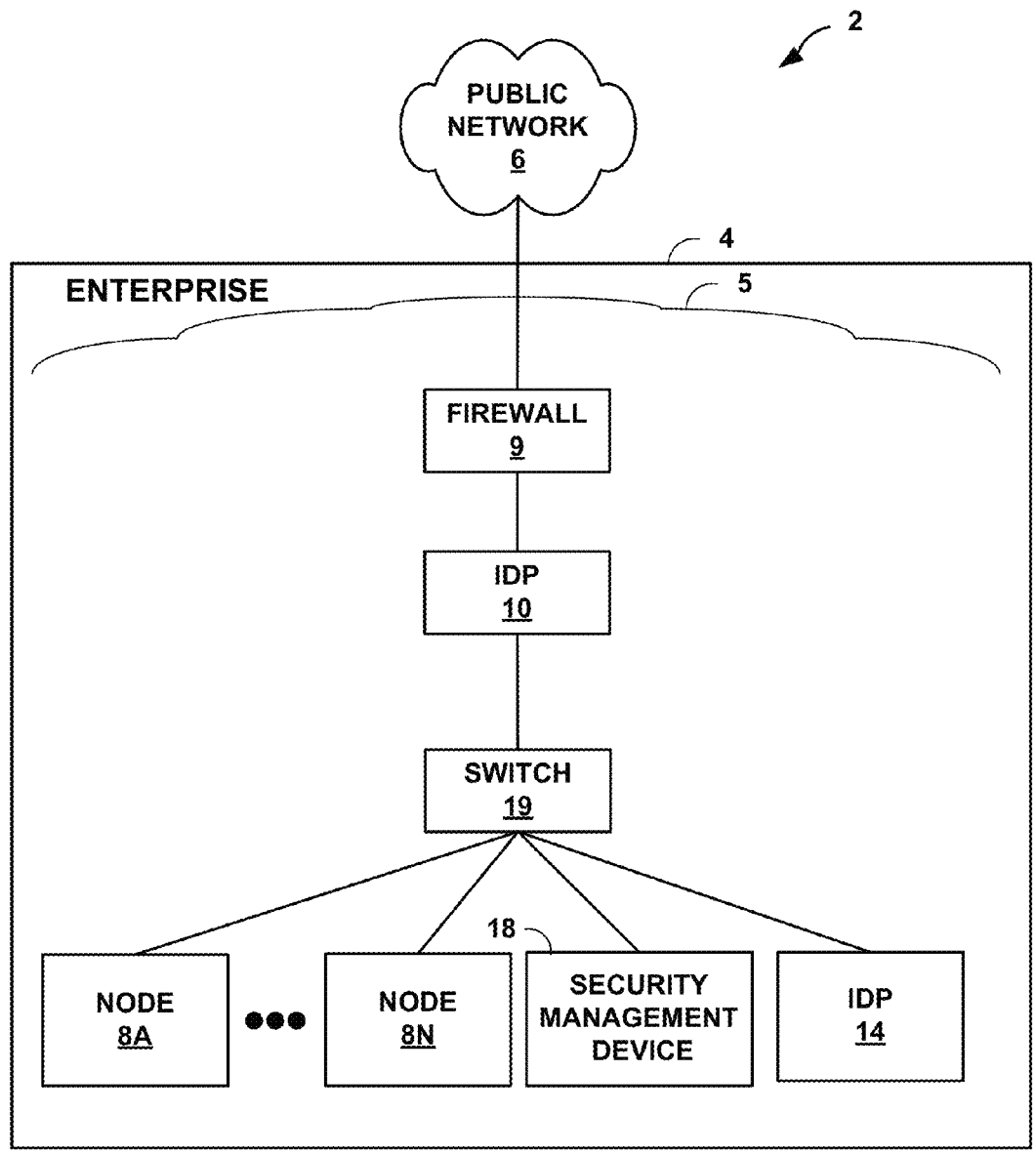
FIG. 1 is a block diagram illustrating an exemplary enterprise computer network in which an intrusion detection and prevention (IDP) may attempt to detect malicious network sessions, such as bots, in accordance with the techniques described in this disclosure.

FIG. 1 is a block diagram illustrating an exemplary enterprise computer network 4 in which an intrusion detection and prevention (IDP) device 10 may attempt to detect network sessions originated by malicious, automated software agents, such as bots, in accordance with the techniques described in this disclosure. References in this disclosure to "bots" should generally be understood as references to automated software agents, which may perform malicious or otherwise unwanted behaviors. Although this disclosure generally refers to an IDP device, similar techniques may be applied by an intrusion detection system (IDS) or intrusion prevention system (IPS). In the example of FIG. 1, IDP 10 is a single network device. For example, any of firewall 9, switch 19, security management device 18, IDP 14, or individual ones of nodes 8A-8N, or other devices, such as routers, virtual private network (VPN) appliances or gateways, may perform the functions described with respect to IDP 10.

Network 4 includes a private enterprise computing network 5 that is coupled to public network 6, such as the Internet. Public network 6 may include, for example, one or more client computing devices. Firewall 9 protects private enterprise network 5 and, in particular, internal computing nodes 8A-8N (computing nodes 8). Computing nodes 8 represent any private computing device within enterprise network 5, for example, workstations, laptops, file servers, print servers, database servers, web servers, e-mail servers, databases, printers, personal digital assistants (PDAs), smart phones, and other devices. Security management device 18 may manage one or more network security devices of enterprise network 5, e.g., IDP 10, firewall 9, IDP 14, or one or more of computing nodes 8. In one example, security management device 18 may implement the simple network management protocol (SNMP) to modify settings of the network security devices. Switch 19 directs network traffic to and from destinations within enterprise network 5, e.g., one of computing nodes 8, security management device 18, IDP 14, and IDP 10.

In the example of FIG. 1, enterprise network 5 includes IDP 10 that monitors traffic flowing between firewall 9 and internal computing nodes 8. In particular, IDP 10 monitors packets of a packet flow, where the packets encapsulate sub-packets of encapsulated packet flows, in addition to normal packets. IDP 10 attempts to determine whether a particular network communication represents a network attack. The network communication may comprise a standard packet or an encapsulated sub-packet. IDP 10 may first attempt to identify an application associated with the network communication. IDP 10 may also determine whether the network communication represents a multi-layered application. Further details on application identification, e.g., for multi-layered applications, may be found within U.S. patent application Ser. No. 11/937,163, Yang et al., "Multi-layered Application Classification and Decoding," filed Nov. 8, 2007, and U.S. patent application Ser. No. 11/835,923, Burns et al., "Identifying Applications for Intrusion Detection Systems," filed Aug. 8, 2007, each of which are hereby incorporated by reference in their respective entireties.

IDP 10 may also integrate pattern matching with application- and protocol-specific anomaly detection to identify sophisticated attack behaviors. In one example, IDP 10 allows the system administrator to specify attack definitions.

The system administrator may specify compound attack definitions. Further details on application of attack definitions, e.g., compound attack definitions, may be found within U.S. patent application Ser. No. 11/045,572, Guruswamy et al., "Compound Attack Detection in a Computer Network," filed Jan. 27, 2005, which is hereby incorporated by reference in its entirety.

The attack definitions may specify, for example, any combination of textual and non-textual (e.g., binary) patterns and protocol anomalies to define complex attack signatures. Moreover, IDP 10 may associate particular signatures with protocols of certain applications. For a given communication session intercepted by IDP 10, the IDP attempts to identify the application type and underlying protocol for the packet flows of the session in order to select one or more attack signatures to apply to the packet flows.

IDP 10 identifies packet flows in the monitored traffic, and transparently reassembles application-layer communications from the packet flows. A set of protocol-specific decoders within the IDP 10 analyzes the application-layer communications and identifies application-layer transactions. In general, a "transaction" refers to a bounded series of related application-layer communications between peer devices. This disclosure may also refer to a transaction as a network session. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one example, a transaction may be identified according to source and destination IP address, protocol, and source and destination port numbers. Other examples may identify a transaction in other ways, for example, by using media access control (MAC) addresses.

IDP 10 applies the attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDP 10 may take one or more programmed actions, such as automatically dropping packet flows associated with the application-layer communications within which the network attack was detected.

In accordance with the techniques of this disclosure, IDP 10 may also use the analysis to compute metrics for the particular network session for determining whether the session is representative of to a normal user's behavior or a malicious automated software agent. IDP 10 may detect the presences of one or more "bots" by calculating an aggregation of scores from various metrics of one or more of the network flows. The metrics may correspond to various types of network activity. A bot, as used in this disclosure, generally comprises a program that executes on one or more networked computing devices to perform a malicious network session. A bot may execute a script, such that the bot performs a series of one or more actions for the malicious network session. Bots may act in concert with other bots, forming a "bot net." A bot net may include several thousand to a million or even more computing devices all acting in concert. In a typical bot net, a group of bots act in concert at the direction of a computing device at a central location, which may include a computing device of the malicious user who wrote the bot or a hacked or infected computer terminal. The centrally located computing device may inform the bots of the bot net as to the identity of a target, such as the network address of the target, and instruct the bots to attack the target.

The malicious software agents may utilize the network session to perform malicious acts, such as, for example, denial of service (DoS) attacks, click fraud, output of spam, or other malicious network activity. Bots and bot nets may also perform unwanted network sessions that are not necessarily malicious. For example, an administrator may determine that web spiders or web crawlers are unwanted on a particular web site, e.g., a public web site presented by enterprise network 5. In general, a web spider comprises a bot that records copies or keywords of a web page and that traverses all or a majority of hyperlinks of the web page, often traversing and indexing an entire web site. IDP 10 identifies and blocks web spiders when an administrator determines that web spiders are unwanted and configures IDP 10 to identify and block web spiders.

To detect bots and malicious or otherwise unwanted network sessions, IDP 10 monitors network traffic for each network session and analyzes the traffic at any of a number of different network layers, such as layers three to layer seven. IDP 10 calculates a plurality of metrics for the network traffic of a network session and aggregates the metrics to produce an aggregate score representing an aggregate indicator as to whether the network session is likely originated by a malicious software agent. That is, IDP 10 generally uses the metrics as a profile for the network session to differentiate between a normal user's behavior and bot-like behavior. IDP 10 may calculate a score for each of the metrics such that a lower score for a metric corresponds to a normal user's behavior while a higher score for the metric corresponds to bot-like behavior. By aggregating the scores across the metrics, IDP 10 generates a composite score and determines that the network session is malicious when the composite score exceeds a minimum threshold. In this manner, IDP 10 may prevent labeling a network session that varies from that of a normal user in only one of the metrics.

IDP 10 also weights the output of each score of the metrics to scale the influence a particular metric has on the aggregate score. An administrator may customize the weights to emphasize or de-emphasize particular attack or bot activity types. For example, a signature for a DoS attack corresponds to a particular subset of the metrics. An administrator may therefore, for example, emphasize the blocking of a DoS attack over click fraud by weighting each of the metrics of the subset corresponding to the signature for a DoS attack more heavily than the other metrics.

IDP 10 calculates scores for a variety of metrics for a particular network session. For example, the metrics used to detect hypertext transport protocol (HTTP)-based attacks may include a number of transactions per single HTTP connection, a number of HTTP connections that are open at the same time by a single client device, a time distribution of HTTP requests from the device, time delay between each of the requests, diversity of requested URLs, percent of requests for a previously reviewed URL, rate of connection establishment, packet rate, server response time distribution, percent of images, scripts, stylesheets, iframes, or other particular data objects of a web page that are requested, link following behavior, user-agent distribution, whether the client properly handles network cookies, client operating system distribution, or other metrics.

As another example, for detection of a SPAM bot, IDP 10 may determine whether the session involves a protocol for exchange of mail (e.g., SMTP, POP3, IMAP protocols) and may computed metrics with respect to the number of mail transactions per session per connection, the number of connections that are open simultaneously, the delay of an e-mail transaction request, a time distribution for the mail transaction request, and whether multiple mail transport protocols are utilized concurrently by a single device.

IDP 10, employing the techniques described herein, may provide several advantages. For example, IDP 10 may determine that a network session is malicious by inspecting the traffic of the network session, including application-layer data of the traffic. Moreover, IDP 10 may detect bots in real time by inspecting the traffic in real-time. IDP 10 may therefore prevent malicious or otherwise unwanted network activity, such as denial of service (DoS) attacks, click fraud, e-mail takeover, web crawling, or other unwanted network sessions originated by an automated software agent in real time.

Figure 2:
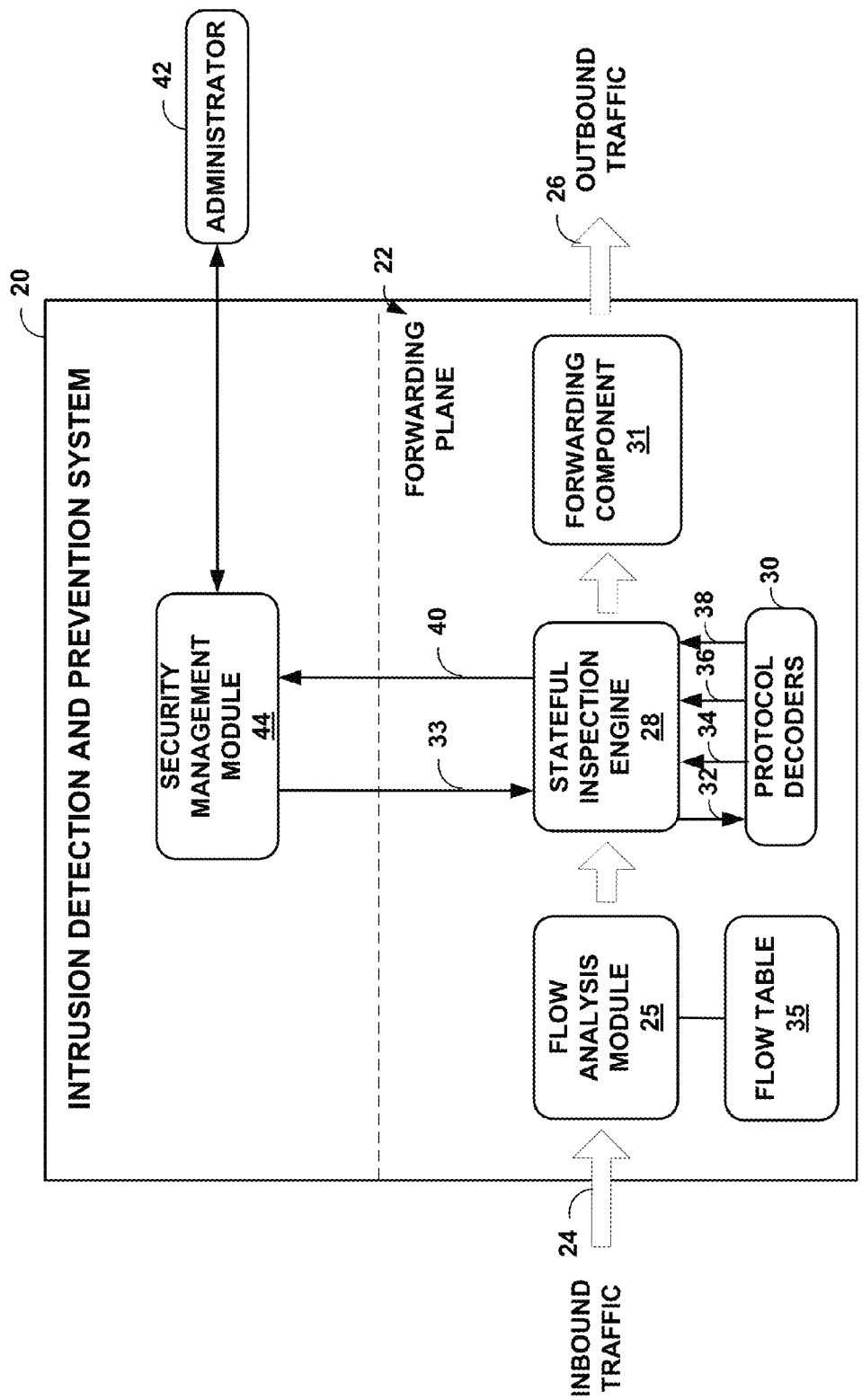
FIG. 2 is a block diagram illustrating an example arrangement of components of an IDP device.

FIG. 2 is a block diagram illustrating an example arrangement of an IDP 20. In the illustrated example, IDP 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, a plurality of protocol decoders 30, forwarding component 31 and security management module 44. The example of IDP 20 of FIG. 2 illustrates IDP 20 as a single network device, such as IDP 10 or 14 of FIG. 1. Other examples may implement the functionality of IDP 20 in multiple network devices or in other types of devices, such as security management device 18, switch 19, or firewall 9 of FIG. 1.

Security management module 44 presents a user interface by which administrator 42 configures IDP 20. For example, administrator 42 may configure IDP 20 to monitor particular subnets of the enterprise network. In addition, security management module 44 presents a user interface by which administrator 42 may specify attack definitions 33, which security management module 44 relays to stateful inspection engine 28. In one example, attack definitions 33 comprise compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. In one example, security management device 18 (FIG. 1) implements the functionality of security management module 44 to enable administrator 42 to program IDP 20 remotely. Security management device 18 may configure IDP 20 via, for example, the simple network management protocol (SNMP) in accordance with a configuration received from administrator 42.

Flow analysis module 25 receives inbound traffic 24 and identifies network flows within the traffic. In one example, flow analysis module 25 includes a network interface (not shown), such as a network interface card (NIC). Each network flow represents a flow of packets in one direction within the network traffic and is identified by at least a source address, a destination address and a communication protocol. Flow analysis module 25 may utilize additional information to specify network flows, including source media access control (MAC) address, destination MAC address, source port, and destination port. Other examples may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 identifies pairs or groups of packet flows that collectively form a single communication session between a client and server. For example, flow table 35 may designate communication session as pairs of packet flows in opposite directions for flows sharing at least some common network addresses, ports and protocol.

As described in further detail below, stateful inspection engine 28 inspects packet flows to identify attacks within the packet flows. In accordance with the techniques of this disclosure, stateful inspection engine 28 inspects the packet flow to detect bots operating at the application layer, or bot-like activity, for the packet flows. When stateful inspection engine 28 detects a bot, stateful inspection engine 28 executes a programmed response, such as sending alert 40 to security management module 44 or instructing forwarding component 31 to drop packets of the packet flow or to end the network session corresponding to the packet flow. Stateful inspection engine 28 may also rate-limit the packet flow, i.e., throttle network sessions corresponding to detected bots to a certain bitrate, such as 10 Mbits/second. Attack detection module 52 may also record an identifier of at least one of the network devices participating in the network session in flow table 35 and block future connection requests originating from the recorded identifier. That is, flow analysis module 25 may receive a connection request, determine that the connection request originates from the identifier recorded in flow table 35, and block the connection request. In this manner, IDP 20 may block future connection requests from the network device participating in the network session as the programmed response. Forwarding component 31 may also construct a message to send to other network devices, such as other routers or IDP, IDS, or IPS devices, to block or otherwise respond to packet flows from the source network device for which stateful inspection engine 28 detected a bot. Alert 40 may include details such as a source address of the packet flow, an identification of the application corresponding to the packet flow, the scores calculated for the metrics of the network session that led stateful inspection engine 28 to conclude that a particular network session was malicious, or other information regarding the network session.

IDP 20 may use a minimum data size of the reassembled TCP segments, in addition to the signature, in order to identify applications corresponding to packet flows or encapsulated packet flows. Certain applications require a minimum amount of data, so IDP 20 may distinguish malicious packet flows by determining whether the packet flow contains enough data for the identified protocol. Moreover, IDP 20 may not necessarily recognize every application. In one example, when an application is unknown, IDP 20 may simply forward the packet flow. Other examples take other actions for unidentified applications, however, such as discarding all packets which target unknown applications or applying a default signature to all packet flows associated with unknown application types. Other examples also apply the techniques of this disclosure to other protocols, such as the user datagram protocol (UDP). IDP 20 accordingly may require a minimum data size of UDP segments in order to identify the application associated with the UDP segments.

In one example, stateful inspection engine 28 includes a co-processor to perform application identification. The co-processor may continually receive input in the form of the packet flow and may constantly perform application identification on the packet flow. For each chunk of the packet flow, the co-processor may return the identity or identities the application(s) that the co-processor identified.

In general, protocol decoders 30 include a set of one or more protocol-specific software modules that process application-layer communications 32 and output transaction data 34 that identifies application-layer transactions. In particular, transaction data 34 indicate when a series of related application-layer communications between two peer devices start and end. In one example, one or more of protocol decoders 30 may be generic protocol decoders, such that the generic protocol decoders attempt to identify the application corresponding to the payload of an application-layer communication 32. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 30 correspond to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols. In one example, each of protocol decoders 30 receives data via a universal software interface, i.e., a software interface that processes application data in a manner that is independent from the underlying transport mechanism. In this way, protocol decoders may be swapped, reused and stacked (layered) when applied to a given packet flow.

After application of protocol decoders 30 to a given packet flow or individual packet, the protocol decoders return transaction data 34, application-layer elements 36, and protocol anomaly data 38 to stateful inspection engine 28. Stateful inspection engine 28 applies attack definitions 33 to protocol-specific application-layer elements 36 and anomaly data 38 to detect and prevent network attacks and other security risks.

In the event a security risk is detected, stateful inspection engine 28 outputs alert 40 to security management module 44 for logging and further analysis. In addition, stateful inspection engine 28 may take additional actions according to a policy definition, such as dropping the packets associated with the communication session, automatically closing the communication session or other action. If no security risk is detected for a given communication session, forwarding component 31 continues to forward the packet flows between the peers. Forwarding component 31 may, for example, maintain a routing table that stores routes in accordance with a topology of the enterprise network for use in forwarding the packet flows. When stateful inspection engine 28 determines that only one or an incomplete subset of a plurality of encapsulated sub-packets corresponds to a malicious network session, forwarding component 31 may forward a reassembled packet comprising only those sub-packets that do not correspond to malicious network sessions.

Figure 3:
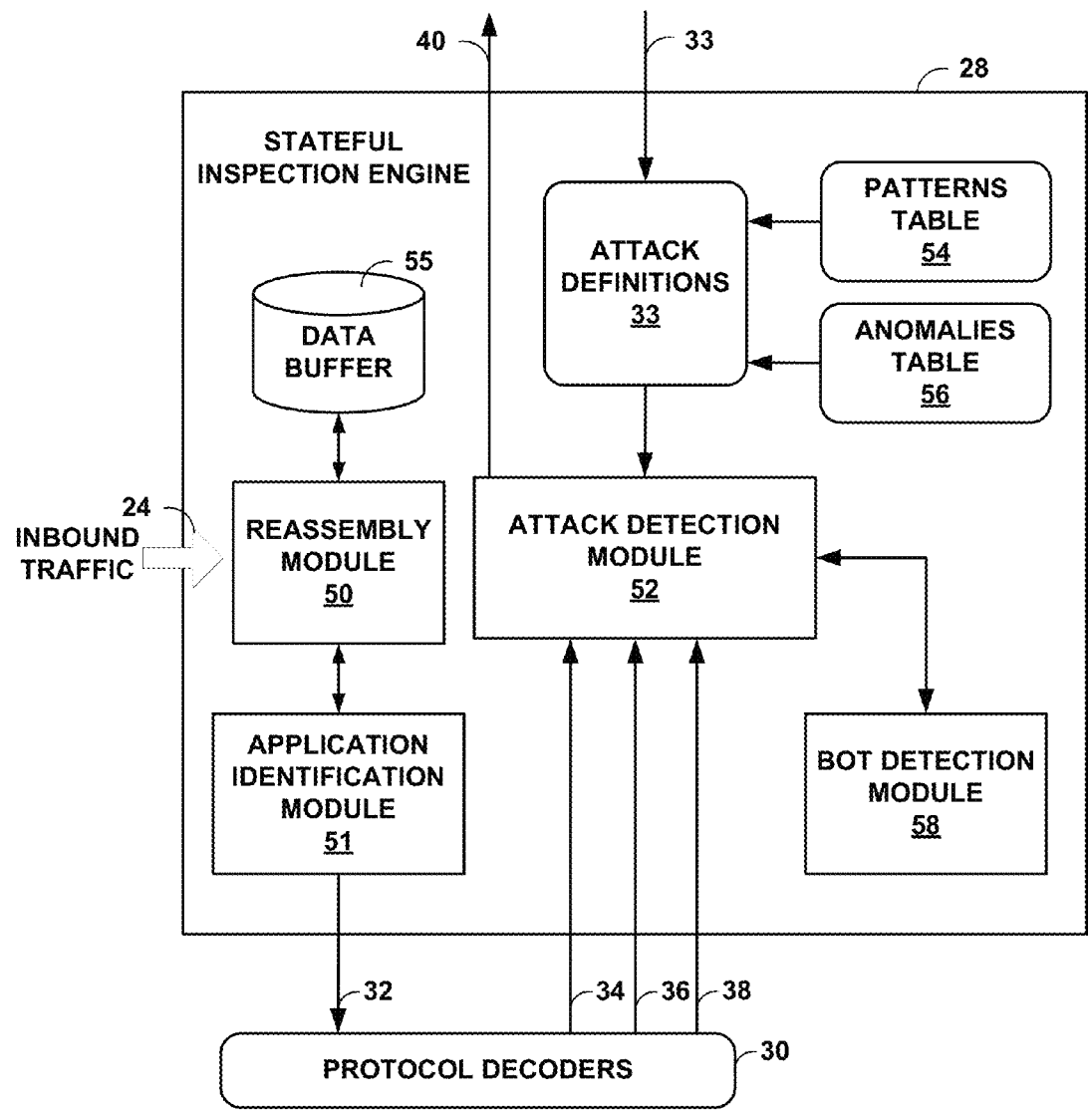
FIG. 3 is a block diagram illustrating an example of a stateful inspection engine as described with respect to FIG. 2 in greater detail.

FIG. 3 is a block diagram illustrating an example of stateful inspection engine 28 of IDP 20. In the example, stateful inspection engine 28 includes reassembly module 50, attack detection module 52, patterns table 54, data buffer 55, anomalies table 56, attack definitions 33, policy action module 68, and policies 70.

Reassembly module 50 receives inbound network traffic 24 and reassembles application-layer communications 32 from the packet flows by removing any underlying transport information (e.g., layer four (L4) information and below). Reassembly module 50 forwards the reassembled application-layer communications 32 to the appropriate protocol decoders 30 for processing.

Stateful inspection engine 28 stores attack definitions 33 received from security management module 44. Attack definitions 33 may be stored, for example, in a computer-readable medium, such as random access memory (RAM). Each of attack definitions 33 specifies a combination of one or more patterns specified within patterns table 54 and one or more protocol-specific anomalies specified within anomalies table 56.

When stateful inspection engine 28 receives a packet as part of a packet flow, reassembly module 50 buffers the packet in data buffer 55. In one example, data buffer 55 stores data as a sliding window. That is, data buffer 55 stores data until becoming full or reaching a specified required amount of minimum data for identification. When full, data buffer 55 discards certain data to make room for storing new data. In one example, data buffer 55 stores and discards data according to a first-in, first-out (FIFO) protocol wherein the first data to be stored is the first data to be discarded when data buffer 55 becomes full. In another example, data buffer 55 discards data according to a least recently used protocol wherein, when data buffer 55 is full, the packet flow which has been least recently used will be discarded to make room for new data to be stored.

In one example, reassembly module 50 associates packets in a packet flow of a network session according to the 5-tuple {source IP address, destination IP address, protocol, source port, destination port}. Other examples use other methods to associate packets with a particular packet flow or encapsulated packet flow. In one example, IDP 20 comprises part of a network that utilizes virtual local area networks (VLANs). Accordingly, reassembly module 50 may associate packets in a packet flow according to a VLAN identifier, a source address, and a destination address.

Attack detection module 52 applies compound attack definitions 33 to application-layer elements 36 and protocol anomaly data 38 received from protocol decoders 30. The application-layer elements 36 may comprise elements of non-encapsulated packet flows or encapsulated packet flows. That is, attack detection module 52 may detect network attacks in either normal, non-encapsulated network traffic or in encapsulated packet flows. For each of compound attack definitions 33, attack detection module 52 selects the one or more patterns within patterns table 52 specified by the compound attack definition and determines whether any of application-layer elements 36 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 30 match the protocol anomalies specified by attack definitions 33. Attack detection module 52 determines that the corresponding packet flow matches one of attack definitions 33 when both the patterns and protocol anomalies specified by the attack definition are detected within a given communication session. Further, each of attack definitions 33 may specify whether the pattern matching and protocol anomalies must be satisfied on a per-transaction basis or over the lifetime of the communication session.

Attack detection module 52 interacts with bot detection module 58 to determine whether a particular network session corresponds to a normal user or to a bot. As explained in greater detail with respect to FIG. 4, bot detection module 58 calculates scores for a plurality of metrics for a particular network session, aggregates the scores, compares the aggregate score to a threshold, and determines that the network session corresponds to a bot when the aggregate score exceeds the threshold. Attack detection module 52 passes various information to bot detection module 58 to perform these calculations. For example, attack detection module 52 may pass transaction data 34 and application-layer elements 36 to bot detection module 58. Attack detection module 52 may also retrieve and pass data from flow table 35 to bot detection module 58, such as a number of open connections, a number of requests for each open connection, a timestamp for each request, and/or a timestamp for each reply to each request. Attack detection module 52 may also pass full packets to bot detection module 58 as received by IDS 20 or TCP headers of the packets to bot detection module 58 so that bot detection module 58 may inspect the TCP headers to determine an operating system being used by a party to the communication session.

In the event a security risk is detected, stateful inspection engine 28 outputs alert 40 to security management module 44 (FIG. 2) for logging and further analysis. Stateful inspection engine 28 may also direct forwarding component 31 to execute a programmed response to the security risk. The programmed response may include automatically dropping packets of the packet flow associated with the application-layer communications within which the network attack was detected. Stateful inspection engine 28 may also cause forwarding component 31 to send a close session message to one or more participants in the malicious network session as the programmed response.

Figure 4:
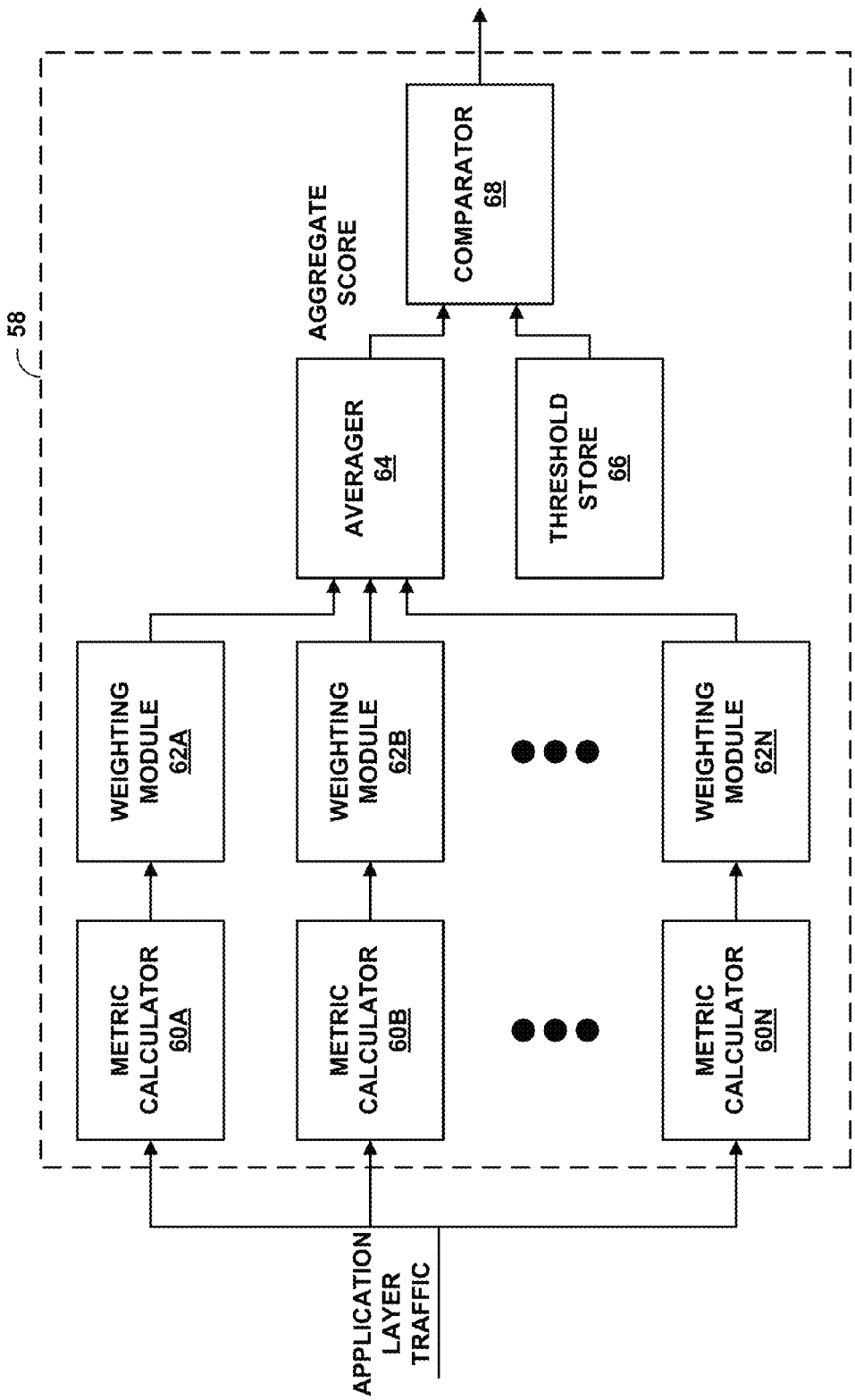
FIG. 4 is a block diagram illustrating an example bot detection module as described with respect to FIG. 3 in greater detail.

FIG. 4 is a block diagram illustrating an example bot detection module 58. In the example of FIG. 4, bot detection module 58 includes metric calculators 60A-60N (metric calculators 60), weighting modules 62A-62N (weighting modules 62), averager 64, threshold store 66, and comparator 68. Each of metric calculators 60 calculates a score for a corresponding metric regarding a network session based on data of received traffic of the network session. The data may include application-layer data, such as transaction data 34 and application-layer elements 36. The data may also include data from flow table 35, such as open communication sessions between each server and client, packet flows, connections, transactions for each connection, times for each transaction request, and times for each reply to a transaction request. Metric calculators 60 provide the scores to a corresponding one of weighting modules 62. Each of metric calculators 60 output a scalable score that indicates whether the network session is more "normal-user-like" or more "bot-like." For example, each of metric calculators 60 may output a score between 0 and 100, where a score of "0" represents that the network session exhibits properties that are more like that of a normal user for that particular metric, and where a score of "100" represents that the network session exhibits properties that are more like that of a bot for that particular metric.

Weighting modules 62 weight the corresponding score by scaling the score up or down by a particular amount. For example, one of weighting modules 62, e.g., weighting module 62A, may scale the corresponding score, in this case the score calculated by metric calculator 60A, by a particular weighting factor. Weighting module 62A may scale the output of metric calculator 60A by a factor of "1.0" to not change the score at all. Weighting module 62A may scale the output of metric calculator 60A by a factor greater than one, e.g., "1.5," to increase the value of the score calculated, resulting in the score from metric calculator 60A factoring into the aggregate score more heavily. Weighting module 62A may also scale the output of metric calculator 60A by a factor less than one, e.g., "0.5," to decrease the value of the score calculated, resulting in the score from metric calculator 60A factoring into the aggregate score less heavily. Each of weighting modules 62 may apply a different weighting factor to output of the respective one of metric calculators 60. Weighting modules 62 send respective weighted scores to averager 64.

Averager 64 calculates an average score from the weighted scores from output of weighting modules 62. In examples that do not include weighting modules 62, averager 64 calculates an average score from the scores calculated by metric calculators 60. In one example, averager 64 calculates an aggregate score as the average of the weighted scores, e.g., according to the formula:

$$\text{Aggregate score} = \frac{\sum_{i=0}^{N} weightedMetricScore(i)}{N}$$

where the function weightedMetricScore(i) corresponds to the output of the $i^{th}$ one of weighting modules 62. Although the example formula represents calculating the score serially on the output of weighting modules 62, it should be understood that in some examples, each of weighting modules 62 calculates the weighted scores in parallel, e.g., with dedicated hardware or a plurality of different sets of programmable hardware.

Threshold store 66 generally stores a threshold value for determining whether the aggregate score calculated by averager 64 represents normal user behavior or bot-like behavior. Comparator 68 compares the aggregate score calculated by averager 64 to the threshold of threshold store 66 and, when the aggregate score exceeds the threshold, comparator 68 determines that the network session being analyzed is being performed by a bot or a bot-like system or program.

Metric calculators 60 each calculate a variety of different metrics that generally differentiate normal user behavior from bot-like behavior. Moreover, the particular metrics calculated may differ based on the type of application or protocol corresponding to the network session. For example, for a network session utilizing HTTP, metric calculators 60 may calculate metrics including a number of connections that are open at the same time, a number of transactions per connection, a time distribution of requests, time delay between requests, diversity of requested URLs, percent of requests for a previously reviewed URL, rate of connection establishment, packet rate, server response time distribution, percent of images, scripts, stylesheets, iframes, or other particular data objects of a web page that are requested, link following behavior, user-agent distribution, cookie handling/support, client OS distribution, or other metrics. These metrics for HTTP may correspond to a first subset of the metrics calculated by metric calculators 62. A second subset of the metrics calculated by metric calculators 62 may correspond to an e-mail protocol, such as Simple Mail Transfer Protocol (SMTP), Post Office Protocol (POP), or Internet Mail Access Protocol (IMAP).

Attack detection module 33 (FIG. 3) may dynamically adjust the weightings applied by weighting modules 62 based on an identified application or protocol for a particular network session. In the above example, attack detection module 33 may determine that a network session is utilizing HTTP, and therefore increase the weightings applied by the weighting modules 62 corresponding to the first subset of metrics, i.e., the metrics calculated for HTTP. As a further example, attack detection module 33 may decrease the weightings applied to scores calculated by particular ones of metric calculators 62 that do not correspond to HTTP. For a different network session, e.g., corresponding to an e-mail protocol, attack detection module 33 may dynamically adjust the weightings to increase the weightings for the second subset of metrics and/or decrease the weightings of other metrics calculated by metric calculators 60.

By way of example, one of metric calculators 62 may calculate score representative of a number of connections that are open for a particular network destination. Empirical data have shown that three to five concurrent connections are common for normal users. Therefore, in one example, the one of metric calculators 62 may determine whether the number of connections that are open for a particular session is between three and five. When the number of open connections is less than three or more than five, the one of metric calculators 62 outputs a score indicating that, for this metric, the network session is more "bot-like." When the number of open connections is between three and five, the one of metric calculators 62 outputs a score indicating that, for this metric, the network sessions collectively are more like a normal user. For example, the one of metric calculators 62 may output the score as a function of the difference between the number of open connections for the network destination and the number of concurrent open connections for a normal user with respect to a network destination. The scores presented in the pseudocode below are merely examples, and may be modified by an administrator or other user according to the user's specific requirements. In one example, one of metric calculators 62 may calculate the score representative of the number of connections that are open for a particular network destination according to the following pseudocode:

```
if (number_of_open_connections < 3)
    score = 10;
else if (number_of_open_connections < 5)
    score = 0;
else if (number_of_open_connections < 10)
    score = 50;
else // number_of_open_connections > 10
    score = 100;
```

As another example, one of metric calculators 62 may calculate a score representative of a number of transactions per connection. Empirical data have shown that five to twenty transactions per connection are common for normal users, and transactions per connection outside of this correspond to bot-like behavior. Therefore, in one example, the one of metric calculators 62 determines whether the number of transactions per connection is between five and twenty. When the number of transactions per connection is less than five or more than twenty, the one of metric calculators 62 outputs a score indicating that, for this metric, the network session is more "bot-like." When the number of open connections is between five and twenty, the one of metric calculators 62 outputs a score indicating that, for this metric, the network session is more like a normal user. For example, the one of metric calculators 62 may output the score as a function of the average distance between the number of transactions per connection for the network session and the number of transactions per connection for a normal user's network session. The scores presented in the pseudocode below are merely examples, and may be modified by an administrator or other user according to the user's specific requirements. In one example, the one of metric calculators 62 may calculate a score according to the following pseudocode:

```
if (avg_number_of_transactions_per_connection < 5)
    score = 25;
else if (avg_number_of_transactions_per_connection < 20)
    score = 0;
else if (avg_number_of_transactions_per_connection < 30)
    score = 50;
else // avg_number_of_transactions_per_connection > 30
    score = 100;
```

As another example, one of metric calculators 62 may calculate a score representative of a time distribution between requests, i.e., distribution of delays between requests. Empirical data have shown that, for a normal user, there will be a burst of a large number of requests corresponding to a time when the user accesses a new web page, and then a pause corresponding to a time during which the user observes data of the web page (e.g., text, pictures, movies, audio, etc.). For a bot, on the other hand, the empirical data have shown that there is very little if any delay between requests. In recognition of this, the one of metric calculators 62 may calculate a score representative of the average delay between requests such that the score is lower when there is a longer delay between requests and the score is higher when there is a shorter or practically no delay between requests. The scores presented in the pseudocode below are merely examples, and may be modified by an administrator or other user according to the user's specific requirements. In one example, the one of metric calculators 62 may calculate the score according to the following pseudocode:

```
if (avg_delay_between_requests < .1) // .1 second
    score = 100;
else if (avg_delay_between_requests < 1) // 1 second
    score = 50;
else if (avg_delay_between_requests < 3) // 3 seconds
    score = 25;
else // avg_delay_between_requests > 3 seconds
    score = 0;
```

As another example, one of metric calculators 62 may calculate a score representative of an average server response time to requests. Bots may be programmed to identify a request that consumes a large amount of a server's resources, as indicated by a longer server response time, and then to repeatedly issue expensive requests, i.e., the requests that consume the most server resources. Normal users, on the other hand, do not seek out expensive requests intentionally, and may even avoid such requests in favor of requests that produce faster results. In recognition of this, the one of metric calculators 62 may calculate a score representative of the average server response time to requests such that the score is higher when there is a shorter server response time and the score is lower when there is a longer server response time. The scores presented in the pseudocode below are merely examples, and may be modified by an administrator or other user according to the user's specific requirements. In one example, the one of metric calculators 62 may calculate the score according to the following pseudocode:

```
if (avg_server_response_time < .5) // .5 seconds
    score = 0;
else if (avg_server_response_time < 1) // 1 second
    score = 30;
else if (avg_server_response_time < 3) // 3 seconds
    score = 60;
else // avg_server_response_time > 3 seconds
    score = 100;
```

As another example, one of metric calculators 62 may calculate a score representative of a percent of requested data objects of a particular web page. The data objects include, for example, text, images, videos, hyperlinks, scripts such as Javascript, iframes, stylesheets, or other data objects. A normal user typically uses a web browser configured to request all of the data objects of a web page so that the user may observe all of the data objects. Bots, on the other hand, do not use many of these objects, and in fact, retrieving such objects waste bandwidth from the perspective of a bot. Bots may be therefore be programmed to request only a small subset of the available data objects of a particular web page. In recognition of this, the one of metric calculators 62 may calculate a score representative of the percent of data objects requested such that the score is lower when more data objects are requested and the score is higher when fewer data objects are requested. The scores presented in the pseudocode below are merely examples, and may be modified by an administrator or other user according to the user's specific requirements. In one example, the one of metric calculators 62 may calculate the score according to the following pseudocode:

```
if (object_request_percentage < 10) // less than 10% of data
    objects requested score = 100;
else if (object_request_percentage < 30) // less than 30% of data
    objects requested score = 50;
else if (object_request_percentage < 50) // less than 50% of data
    objects requested score = 25;
else // object request percentage >= 50%
    score = 0;
```

As another example, one of metric calculators 62 may calculate a score representative of link-following behavior. Normal users typically follow links of one web page to another web page to browse the Internet. Normal users also typically revisit pages to find a different link. Bots may be programmed to jump around pages wildly, rarely ever following links of one page to arrive at a linked page. Web spiders, which some administrators determine are undesirable, may follow each link of a web page exactly once. In recognition of this, the one of metric calculators 62 may calculate a score representative of the average link-following behavior such that the score is lower when links are followed one or more times, and when pages are revisited, and the score is higher when pages are not revisited or links are never followed, or when every link is followed exactly once. For example, one of metric calculators 62 may calculate a percentage of uniform resource locators (URLs) that a particular user visited which were not previously specified. The scores presented in the pseudocode below are merely examples, and may be modified by an administrator or other user according to the user's specific requirements. In one example, the one of metric calculators 62 may calculate the score representative of link-following behavior according to the following pseudocode:

```
if (unspecified_url_percentage < 5%)
    score = 0;
else if (unspecified_url_percentage < 25%)
    score = 50;
else // unspecified_url_percentage >= 25%
    score = 100;
```

In another example, one of metric calculators 62 may calculate a percentage of links on a particular page that are visited during a network session. When a large number of links on a page are followed, the one of metric calculators 62 may determine that the score for link following behavior should be higher, e.g., because the agent visiting those links exhibits web spider behavior. In some examples, the one of metric calculators 62 may assign a score for the percentage of links followed only when there are a large number of links on the page, e.g., greater than 20 links. The scores presented in the pseudocode below are merely examples, and may be modified by an administrator or other user according to the user's specific requirements. In one example, the one of metric calculators 62 may calculate the score representative of link-following behavior according to the following pseudocode:

```
if (available_links > 20) {
    if (percent_links_followed > 50) // > 50% of links followed
        score = 100;
    else if (percent_links_followed > 25) // > 25% of links followed
        score = 50;
    else // <= 25% of links followed
        score = 0;
}
else // 20 or fewer available links, so no score
    score = 0;
```

As another example, one of metric calculators 62 may calculate a score representative of a particular user agent, e.g., a web browser such as Microsoft Internet Explorer, Mozilla Firefox, Netscape Navigator, Opera Browser, Apple Safari, Google Chrome, or other web browser, and/or whether the user agent changes during the network session. HTTP packets include a field for identifying a user agent. Normal users tend to use the same user agent throughout an entire network session and tend to use common user agents. Bots may be programmed to cycle through different user agents or represent themselves as less common user agents. In recognition of this, the one of metric calculators 62 may calculate a score representative of the user agent in use and whether the user agent changes such that the score is lower when the user agent is a common user agent and when the user agent stays the same throughout the network session and the score is higher when the user agent changes throughout the session and/or when the user agent is less common. The one of metric calculators 62 may output a score for a less common user agent that is used consistently as a lower score than that output for a changing user agent. The scores presented in the pseudocode below are merely examples, and may be modified by an administrator or other user according to the user's specific requirements. In one example, the one of metric calculators 62 may calculate the score according to the following pseudocode:

```
if (isKnownSecurityRisk(request_2.agent))
    score = 100;
else if (request_2.agent != request_1.agent)
    score = 70;
```

```
    else if (isUncommonAgent(request_2.agent))
        score = 40;
    else
        score = 0;
```

The one of metric calculators 62 may additionally record statistics regarding use of particular agents. For example, the one of metric calculators 62 may record a percentage of all network sessions that utilize each recognizable agent. The one of metric calculators 62 may then detect a large shift in these statistics. That is, when a less common user agent suddenly shifts to being used in a large number of network sessions, the one of metric calculators 62 may determine that network sessions using that agent are originated by automated software agents and block all network sessions using that agent. For example, if a particular browser is typically used in one percent of all network sessions, and then suddenly that browser is used in ninety percent of all network sessions, the one of metric calculators 62 may assign a high score to all network sessions using that browser for the user agent score.

As another example, one of metric calculators 62 may calculate a score representative of whether the client application appears to properly handle cookies in a manner a normal user would handle cookies. Users typically enable cookies, while bots tend to ignore cookies received from the network. That is, responses from bots tend not to include cookies previously send to the bot-infected device by a server. In recognition of this, the one of metric calculators 62 may calculate a score representative of cookie use behavior such that the score is lower when cookies are used and included in subsequent responses and the score is higher when cookies are not used. The scores presented in the pseudocode below are merely examples, and may be modified by an administrator or other user according to the user's specific requirements. In one example, the one of metric calculators 62 may calculate the score according to the following pseudocode:

```
    if (session.cookiesDisabled)
        score = 100;
    else
        score = 0;
```

As another example, one of metric calculators 62 may calculate a score representative of an operating system used during a network session. Normal users tend to use more common operating systems, while bots may be programmed to exploit a security vulnerability of a particular operating system. More specifically, viruses used to implant a bot may exploit a security vulnerability of a particular operating system. In recognition of this, the one of metric calculators 62 may calculate a score representative of the operating system used during the network session such that the score is lower when the operating system is a commonly used operating system and the score is higher when the operating system is less common. The one of metric calculators 62 may further be configured to output a higher score for a particular operating system when there exists a known security vulnerability for that operating system that has been exploited by viruses. When the security vulnerability is patched, the one of metric calculators 62 may be configured to reduce the score for that operating system. The one of metric calculators 62 may detect the operating system for the network session according to TCP packet parameters set by the operating system when the operating system sends a TCP packet. In some examples, the one of metric calculators 62 may detect a sudden increase in the use of a particular operating system and assign a high score to network session using that operating system, in a manner similar to that discussed above with a sudden increase in the use of a less common user agent. The scores presented in the pseudocode below are merely examples, and may be modified by an administrator or other user according to the user's specific requirements. In one example, the one of metric calculators 62 may calculate the score according to the following pseudocode:

```
    if (isKnownSecurityRisk(session.OS))
        score = 100;
    else if (isUncommonOS(session.OS))
        score = 60;
    else
        score = 0;
```

Figure 5:
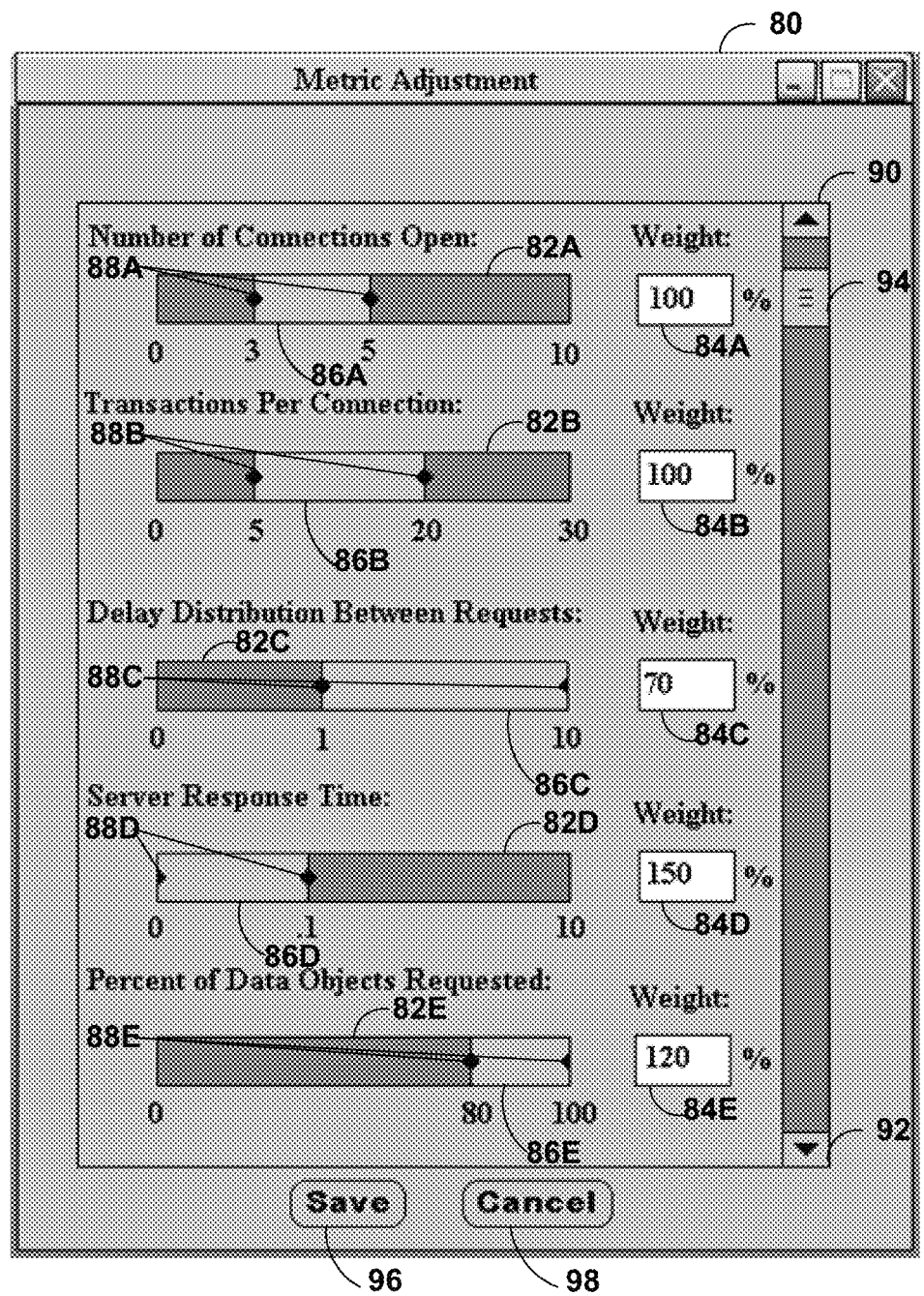
FIG. 5 is a screenshot illustrating an example user interface for configuring a plurality of metric calculators.

FIG. 5 is a screenshot illustrating an example user interface 80 for configuring a plurality of metric calculators, such as metric calculators 60 (FIG. 4). Administrator 42 may also use user interface 80 to configure weighting modules 62 (FIG. 4). In one example, security management module 44 (FIG. 2) presents user interface 80 to administrator 42, such that administrator 42 may set or adjust a configuration for IDP 20. In the example of FIG. 5, user interface 80 includes metric ranges 82A-82E (metric ranges 82), weighting text boxes 84A-84E (weighting text boxes 84), sliders 86A-86E (sliders 86), adjustment arrows 88A-88E (adjustment arrows 88), scroll up arrow 90, scroll down arrow 92, scroll slider 94, save button 96, and cancel button 98.

Each set of corresponding ones of metric ranges 82, weighting text boxes 84, sliders 86, and adjustment arrows 88 corresponds to one of metric calculators 60 (FIG. 4) for adjusting parameters of a particular metric. In the example of FIG. 5, the sets correspond to a number of connections that are open, a number of transactions per connection, a delay distribution between requests, a server response time to a particular request, and a percent of data objects requested. Although only five sets are shown in the example of FIG. 5, similar mechanisms may be used to adjust additional parameters for other metrics, e.g., any or all of the metrics discussed with respect to FIG. 4. A user may also cause user interface 80 to display other adjustment parameters by selecting scroll up arrow 90 or scroll down arrow 92, or by moving scroll slider 94.

In general, sliders 86 correspond to "normal" user behavior, while portions of respective metric ranges 82 that are not covered by sliders 86 are treated as more bot-like behaviors. In some examples, metric calculators 60 output a score based on the absolute distance the calculated metric occurs from the respective one of sliders 86. That is, when a calculated metric occurs within the respective one of sliders 86, the corresponding one of metric calculators 62 may output a score of 0 or a very low score, whereas when the calculated metric occurs far outside of the respective one of sliders 86, the corresponding one of metric calculators 62 may output a high score.

Values entered in weighting text boxes 84 weight certain metrics more or less heavily than others. By default, the values of weighting text boxes 84 are 100%. However, a user, such as administrator 42, may emphasize or de-emphasize certain metrics by changing the values of weighting text boxes 84. The percentage entered in one of weighting text boxes 84 changes the value of the metric output by the respective one of metric calculators 60 by the value entered. Thus when a value of "50%" is entered, the metric score is decreased to 50% of its original value, whereas when a value of "150%" is entered, the metric score is increased by 50%. In this manner, administrator 42 may weight certain metrics more or less heavily, e.g., to particularly emphasize detection of certain network attacks over others.

As one example, metric range 82A, weighting text box 84A, slider 86A, and adjustment arrows 88A each allow a user, such as administrator 42, to adjust parameters relating to calculating a weighted metric for a number of open connections. Metric range 82A allows administrator 42 to set slider 86A anywhere between 0 and 10 open connections. Administrator 42 may adjust the width of slider 86A using adjustment arrows 88A. In the example of FIG. 5, administrator 42 has set slider 86A to cover the area of metric range 82A between 3 and 5 open connections. Slider 86A represents that between 3 and 5 (inclusive) open connections is normal user behavior. Fewer than 3 or more than 5 open connections, however, represents more bot-like behavior. Thus when between 3 and 5 connections are open for a given network session, a corresponding one of metric calculators 60 (e.g., metric calculator 60A) outputs a low score, but when fewer than 3 or more than 5 connections are open, metric calculator 60A outputs a high score, with the score increasing the further away the number of open connections is from being between 3 and 5. Administrator 42 has also set the value of weighting text box 84A at 100%.

As another example, metric range 82B, weighting text box 84B, slider 86B, and adjustment arrows 88B each allow administrator 42 to adjust parameters relating to calculating a weighted metric for an average number of transactions per open connection. Metric range 82B allows administrator 42 to set slider 86B anywhere between 0 and 30 open connections. Administrator 42 may adjust the width of slider 86B using adjustment arrows 88B. In the example of FIG. 5, administrator 42 has set slider 86B to cover the area of metric range 82B between 5 and 20 transactions per connection. Slider 86B represents that between 5 and 20 transactions per open connection is normal user behavior. Fewer than 5 or more than 20 transactions per connection, however, represent more bot-like behavior. Thus when between 5 and 20 transactions occur on average for connections of a network session, a corresponding one of metric calculators 60 (e.g., metric calculator 60B) outputs a low score, but when fewer than 5 or more than 20 average transactions per connection occur for the network session, metric calculator 60B outputs a high score, with the score increasing the further away the average number of transactions per connection is from being between 5 and 20. Administrator 42 has also set the value of weighting text box 84B at 100%.

As another example, metric range 82C, weighting text box 84C, slider 86C, and adjustment arrows 88C each allow administrator 42 to adjust parameters relating to calculating a weighted metric for a delay between requests. Metric range 82C allows administrator 42 to set slider 86C anywhere between 0 and 10 minutes of average delay between requests issued during a network session. Administrator 42 may adjust the width of slider 86C using adjustment arrows 88C. In the example of FIG. 5, administrator 42 has set slider 86C to cover the area of metric range 82A between 1 and 10 average minutes of delay. Slider 86A represents that between 1 and 10 average minutes of delay between requests of a network session is normal user behavior. Fewer than 1 average minute of delay, however, represents more bot-like behavior. For this example, any more than 10 average minutes of delay are treated as normal user behavior, because slider 86C is set to the maximum allowable range of metric range 82C. Thus when a network session has less than one minute of delay between requests on average, a corresponding one of metric calculators 60 (e.g., metric calculator 60C) outputs a high score, with the score increasing the further away the average delay is from being one minute, but when the network session has more than one minute of delay between requests on average, metric calculator 60C outputs a low score. Administrator 42 has also set the value of weighting text box 84C at 70%.

As another example, metric range 82D, weighting text box 84D, slider 86D, and adjustment arrows 88D each allow a user, such as administrator 42, to adjust parameters relating to an average server response time to each request. Metric range 82D allows administrator 42 to set slider 86D anywhere between 0 and 10 minutes. Administrator 42 may adjust the width of slider 86D using adjustment arrows 88D. In the example of FIG. 5, administrator 42 has set slider 86D to cover the area of metric range 82D between 0 and 0.1 minutes per average response time. Slider 86D represents that between 0 and 0.1 minutes average server response time is normal user behavior. Greater than 0.1 minutes, however, represents more bot-like behavior. Thus when the server responds on average in less than 0.1 minutes per request, a corresponding one of metric calculators 60 (e.g., metric calculator 60D) outputs a low score, but when the average server request time is greater than 0.1 minutes, metric calculator 60D outputs a high score, with the score increasing the further away the average server response time is from 0.1 minutes. Administrator 42 has also set the value of weighting text box 84D at 150%.

As another example, metric range 82E, weighting text box 84E, slider 86E, and adjustment arrows 88E each allow a user, such as administrator 42, to adjust parameters relating to calculating a weighted metric for a number of data objects of a web page that were requested. Metric range 82E allows administrator 42 to set slider 86E anywhere between 0 and 100 percent of the data objects. Administrator 42 may adjust the width of slider 86E using adjustment arrows 88E. In the example of FIG. 5, administrator 42 has set slider 86E to cover the area of metric range 82E between 80 and 100 percent of data objects being requested. Slider 86E represents that between 80 and 100 percent of data objects being requested is normal user behavior. Fewer than 80 percent, however, represents more bot-like behavior. Thus when more than 80 percent of data objects of a particular web page are requested for a given network session, a corresponding one of metric calculators 60 (e.g., metric calculator 60E) outputs a low score, but when less than 80 percent of the data objects are requested, metric calculator 60E outputs a high score, with the score increasing the further away the percent of data objects requested is from 80 percent. Administrator 42 has also set the value of weighting text box 84E at 120%.

After administrator 42 has set sliders 86 to desired positions on respective metric ranges 82, administrator 42 may save a configuration by selecting save button 96. Upon selecting save button 96, security management module 44 stores a configuration that includes representations of sliders 86 and weights as entered in weighting text boxes 84. Administrator 42 may also select cancel button 98 to reject changes to the configuration of IDP 20.

Figure 6:
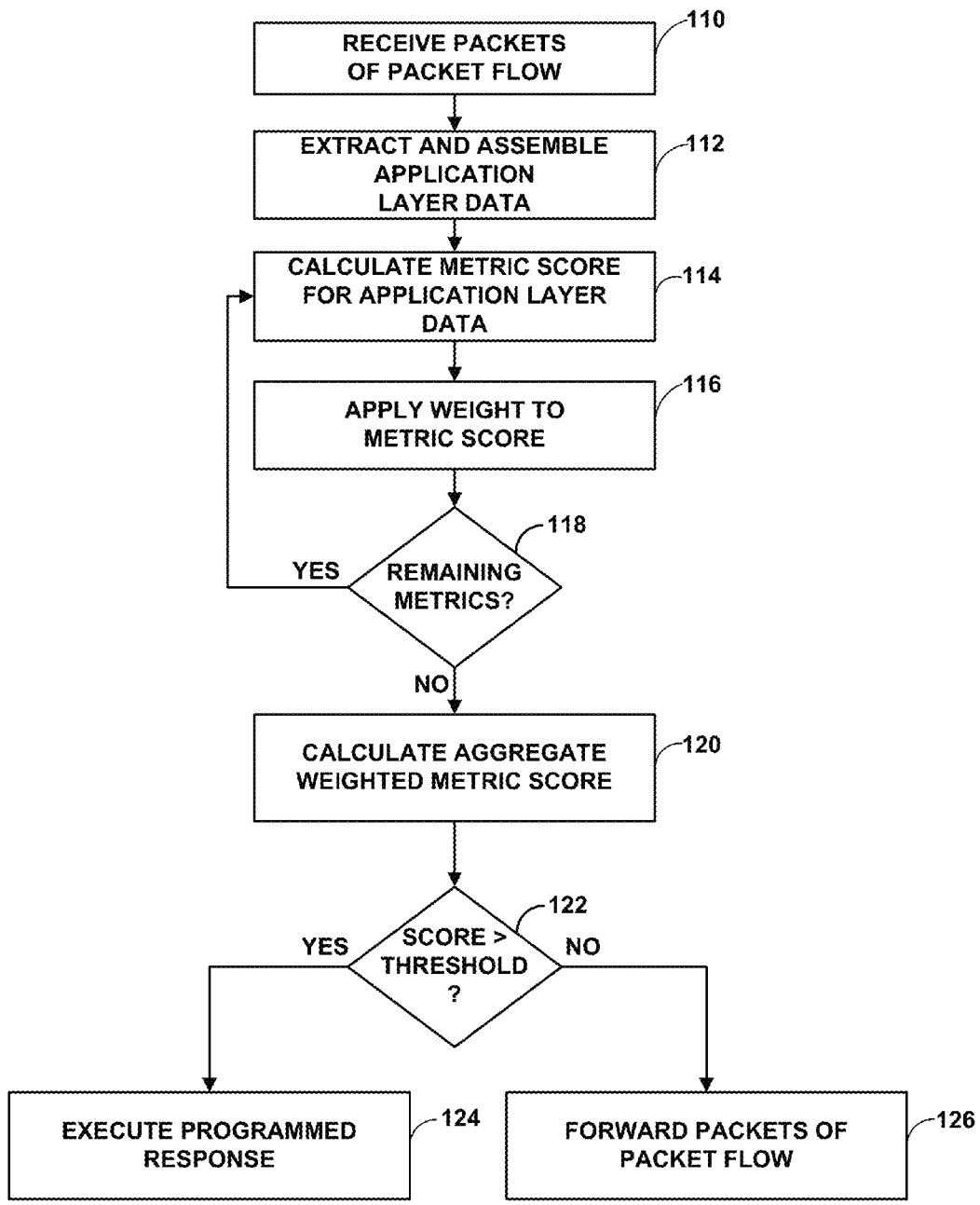
FIG. 6 is a flowchart illustrating an example method for detecting bots by inspecting network traffic.

FIG. 6 is a flowchart illustrating an example method for detecting bots by inspecting application layer traffic. Although the method of FIG. 6 is generally discussed with respect to IDP 20, it should be understood that any IDS, IDP, IPS, or other security device may implement the method discussed with respect to FIG. 6.

Initially, reassembly module 50 of IDP 20 receives packets of a packet flow, i.e., inbound traffic 24 (110). Reassembly module 50 reassembles application-layer data of the packet flow by buffering packets of the packet flow in data buffer 55 (112). In some examples, protocol decoders 30 determine one or more protocols associated with the packet flow, e.g., by analyzing the application-layer data or other data of the packet flow, such as transport layer or network layer data. Attack detection module 52 may attempt to detect certain types of attacks using other attack detection techniques, such as lower-layer attacks according to techniques as known in the art.

Bot detection module 58 then calculates a plurality of weighted metric scores for data of the packet flow. That is, bot detection module 58 calculates a first metric score for the data based on a first characteristic of bot-like traffic (112). For example, metric calculator 60A may calculate the first metric score based on a number of connections that are open for a network session corresponding to the packet flow, and metric calculator 60B may calculate the second metric score based on an average number of requests for a particular connection. Bot detection module 58 then applies a weight to the first metric score (114). In particular, the one of weighting modules 62 corresponding to the one of metric calculators 60 that calculated the metric score applies the weight to the calculated metric score. For example, weighting module 62A calculates a weighted version of the metric score calculated by metric calculator 60A.

Bot detection module 58 calculates weighted metric scores for each available pair of metric calculators 60 and weighting modules 62. In the example method of FIG. 6, bot detection module 58 calculates these scores serially by checking whether there are remaining metrics to be calculated (118), and if so, calculates the weighted metric score for a remaining metric. It should be understood, however, that in some examples, the weighted metric scores may be calculated in parallel, e.g., using dedicated hardware or a plurality of programmable hardware devices each operating simultaneously.

After each of the weighted metric scores are calculated, averager 64 of bot detection module 58 calculates an average weighted metric score based on each of the calculated weighted metric scores (120). For example, averager 64 may add each of the weighted metric scores and divide the sum by the number of metric calculators to produce the average weighted metric score.

Comparator 68 then compares the average weighted metric score calculated by averager 64 against threshold value 66 to determine whether the average weighted metric score exceeds the threshold (122). When the average weighted metric score exceeds the threshold ("YES" branch of 122), IDP 20 executes a programmed response (124). The programmed response may comprise, for example, sending an alert, sending a message to other network devices to block or monitor traffic from either the server or the client, or both, of the network session corresponding to the packet flow, blocking future packets of the packet flow, dropping the packet flow, sending a close-session message to the client of the network session for the packet flow, sending a close-session message to the server of the network session for the packet flow, preventing the client and/or the server from initiating a new network session, preventing certain requests from the client and/or the server (such as blocking database query requests) throttling (e.g., rate-limiting) communications from either or both of the client or the server, or other responses. When the average weighted metric score does not exceed the threshold ("NO" branch of 122), however, IDP 20 forwards packets of the packet flow (126).

A method according to claim 6 may generally include receiving, with a network device, packets of a network session, assembling network session data for the network session from the packets, the network session data comprising application-layer data and packet flow data for the network session, calculating a plurality of scores for the network session data based on a plurality of metrics applied to the network session data, wherein each of the metrics corresponds to a characteristic of a malicious network session originated by an automated software agent, and wherein each of the scores represents a likelihood that the network session is originated by an automated software agent, aggregating the plurality of scores to produce an aggregate score, determining that the network session is originated by an automated software agent when the aggregate score exceeds a threshold, and executing a programmed response when the network session is determined to be malicious. In some examples, the method may further include analyzing agent behavior across multiple network sessions. For example, IDP 20 may apply the method of FIG. 6 to a plurality of network sessions to determine whether any of the plurality of network sessions are originated by automated software agents and to identify those network sessions that are originated by automated software agents.

Figure 7:
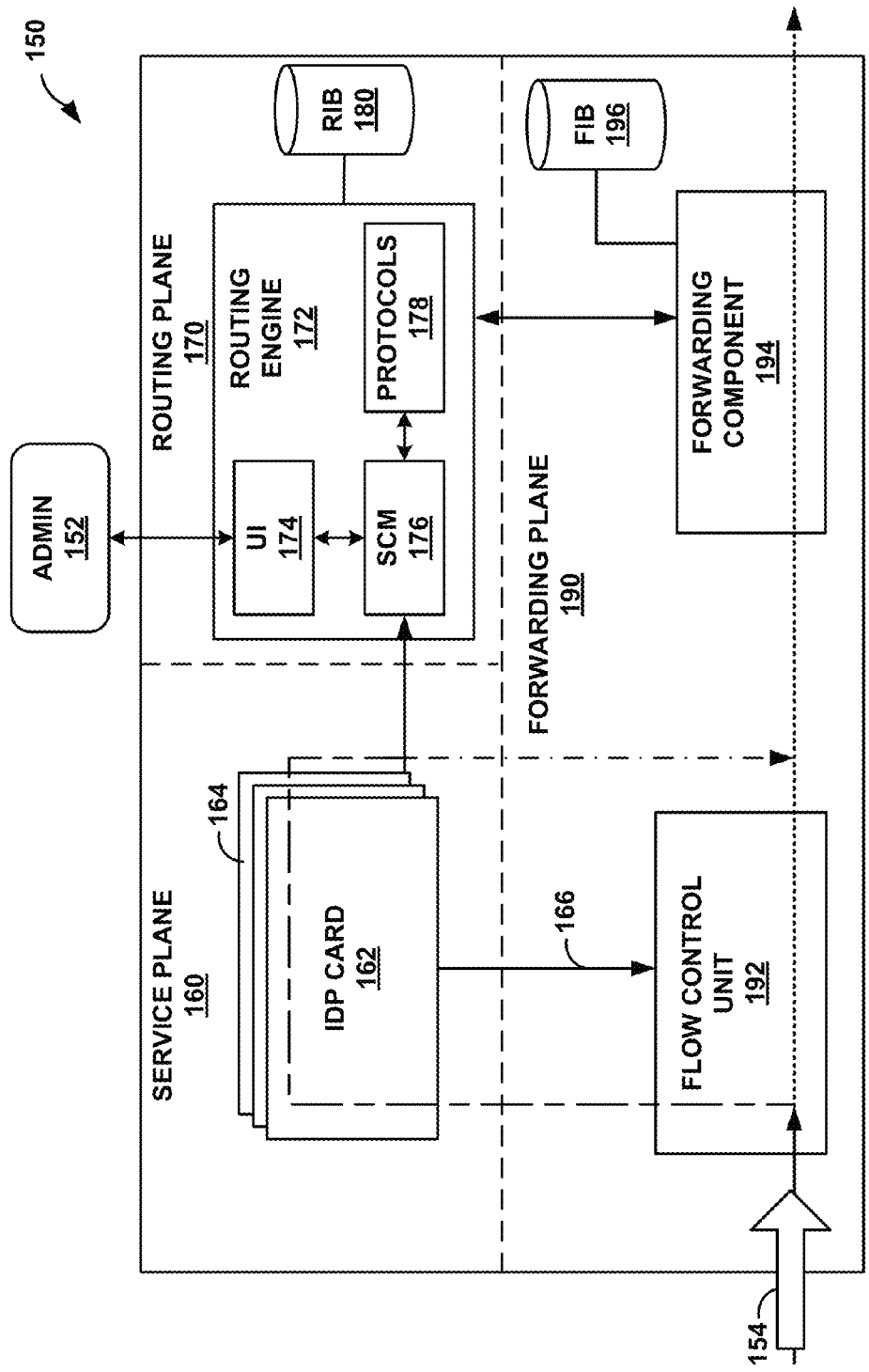
FIG. 7 is a block diagram illustrating an example of a router that includes a service plane card that performs the techniques of this disclosure.

FIG. 7 is a block diagram illustrating an example router 150. In the example of FIG. 7, router 150 comprises distinct "planes" that perform different tasks for router 150. In general, router 150 includes forwarding plane 190 that receives and/or sends packets, routing plane 170 that is dedicated to routing functionality (such as calculating routes through a network), and service plane 160 that includes a plurality of service cards 164 that each perform various miscellaneous tasks for router 150. In general, service cards 164 may extend the functionality of router 150 to perform additional functions for router 150. Service cards 164 may be removed and replaced with other cards that perform other functions.

In the example of FIG. 7, service plane cards 164 include IDP card 162 that generally performs the functions described with respect to IDP 20 (FIGS. 2 and 3). That is, IDP card 162 may include a network interface to receive packets of a network session, a control unit having one or more processors, a reassembly module executing within the control unit to assemble application-layer data for the network session, a bot detection module executing within the control unit to calculate a plurality of scores for the application-layer data based on a plurality of metrics, wherein each of the metrics corresponds to a characteristic of a network session originated by an automated software agent, to produce an aggregate score from an aggregate of the plurality of scores, and to determining that the network session is originated by an automated software agent when the aggregate score exceeds a threshold, and an attack detection module executing within the control unit to perform a programmed response when the network session is determined to be originated by an automated software agent. Service cards 164 may additionally include, for example, a firewall card, a security management card, a user interface card, an additional network interface, or other cards.

Service cards 164 also send messages 166 to flow control unit 192. In one example, IDP card 162 sends messages 166 comprising instructions for a particular packet flow. That is, IDP card 162 may instruct flow control unit 192 to drop packets of a packet flow, to send a close session message to a client or a server of a packet flow, or to stop sending packets of a packet flow to IDP card 162 after determining that the packet flow is not malicious. Other service cards 164 may also send similar messages 166 to flow control unit 192.

Router 150 also includes routing plane 170 in which router 150 performs various routing tasks. For example, routing engine 172 of routing plane 170 calculates routes through a network to which router 150 is connected according to one or more protocols 178. Router 150 also receives advertised routes from other routers via service communication module (SCM) 176. Routing engine 172 stores advertised and calculated routes in routing information base (RIB) 180. Routing engine 172 also sends updates to forwarding component 194 according to advertised and calculated routes, such that forwarding component 194 may properly forward received packets along a route calculated by routing engine 172.

In the example of FIG. 7, routing engine 172 also includes user interface (UI) 174. UI 174 enables administrator (admin) 152 to interact with router 150, e.g., to add to or update protocols 178. In some examples, administrator 152 configures service plane cards 164, such as IDP card 162, using UI 174. For example, UI 174 may present the example user interface of FIG. 5 to allow administrator 152 to configure IDP card 162, e.g., metrics and weightings thereof UI 174 also communicates received weights and metrics to IDP card 164 through service communication module 176.

Forwarding plane 190 generally receives and forwards packets for router 150. Flow control unit 192 receives packets 154 of various packet flows or other network sessions. When flow control unit 192 receives a message intended for routing engine 172, flow control unit 192 directs the message to routing engine 172, e.g., through one of service cards 164. Flow control unit 192 directs certain packets through one or more service cards 164. Flow control unit 192 may also send received packets directly to forwarding component 194. When IDP card 162 has sent a message 166 to flow control unit 192 to block packets of a particular packet flow, flow control unit 192 drops received packets 154 of that packet flow.

Forwarding component 194 forwards packets of a network session to another network device. Forwarding component 194 also maintains forwarding information base (FIB) 196 according to messages received from routing engine 172. When routing engine 172 advertises a route, forwarding component 194 forwards the advertised route to one or more other routers with which router 150 is in communication.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

In one example, a service plane card may include a hardware control unit that performs the techniques described in this disclosure, such that the service plane card may be inserted into a multi-chassis network device. In this manner, by connecting a service plane chassis that implements these techniques to an extensible multi-chassis network device, the multi-chassis network device may incorporate the techniques of this disclosure with the functionality of other chassis connected to the multi-chassis network device. For example, a router may be configured to perform the techniques of this disclosure by connecting a service plane chassis that performs these techniques to the router.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method of determining whether a single network session is originated by an automated software agent, the method comprising:
   receiving, with a network device, packets of a single network session comprising one or more connections between a single client device and a single server device;
   assembling network session data for the network session from the packets, the network session data comprising application-layer data and packet flow data for the network session;
   calculating a plurality of scores for the network session based on a plurality of metrics applied to the network session data, wherein each of the metrics corresponds to a characteristic of a network session originated by an automated software agent, and wherein each of the scores represents a likelihood that the network session is originated by an automated software agent;
   aggregating the plurality of scores to produce an aggregate score such that the aggregate score only reflects the plurality of metrics applied to the network session data for the single network session between the client device and the server device;
   determining that the network session is originated by an automated software agent when the aggregate score exceeds a threshold; and
   executing a programmed response when the network session is determined to be originated by an automated software agent.

2. The method of claim 1, further comprising applying each of a plurality of weighting values to a respective one of the plurality of scores, wherein aggregating the plurality of scores comprises aggregating the plurality of scores having the respective weighting values applied.

3. The method of claim 2, further comprising receiving the plurality of weighting values via a user interface.

4. The method of claim 1, further comprising receiving a definition of at least one of the metrics via a user interface.

5. The method of claim 1, wherein a first one of the metrics corresponds to a number of open connections for the network session, a second one of the metrics corresponds to an average number of transactions per open connection, a third one of the metrics corresponds to a time distribution between requests during the network session, a fourth one of the metrics corresponds to an average server response time to the requests, a fifth one of the metrics corresponds to a percent of data objects of a web page that are requested for the network session, a sixth one of the metrics corresponds to link-following behavior during the network session, a seventh one of the metrics corresponds to changes to a user agent during the network session, an eighth one of the metrics corresponds to web page cookie handling behavior, and a ninth one of the metrics corresponds to an operating system used by the client device of the network session.

6. The method of claim 1, wherein executing a programmed response comprises at least one of sending an alert, dropping the packets of the network session, sending a close-session message to the client device of the network session, blocking connection requests from a network device of the network session, sending a close-session message to the server device of the network session, rate-limiting the network session, sending an identifier of the client device to a network device with instructions to block other network sessions of the client device, and sending an identifier of the server device to the network device with instructions to block network sessions of the server device.

7. A network device for determining whether a single network session is originated by an automated software agent, the network device comprising:
   a network interface to receive packets of a single network session comprising one or more connections between a single client device and a single server device;
   a control unit having one or more hardware-based processors;
   a reassembly module executing within the control unit to re-assemble application-layer data for the network session;
   a flow table to store packet flow information for the network session;
   a bot detection module executing within the control unit to calculate a plurality of scores for the network session based on a plurality of metrics each applied to at least one of the reassembled application-layer data and the packet flow information, wherein each of the metrics corresponds to a characteristic of a network session originated by an automated software agent, wherein the bot detection module is configured to produce an aggregate score from an aggregate of the plurality of scores such that the aggregate score only reflects the plurality of metrics applied to the network session data for the single network session between the client device and the server device, and to determine that the network session is originated by an automated software agent when the aggregate score exceeds a threshold, wherein each of the scores represents a likelihood that the network session is originated by an automated software agent; and
   an attack detection module executing within the control unit to perform a programmed response when the network session is determined to be originated by an automated software agent.

8. The device of claim 7, wherein the bot detection module applies each of a plurality of weighting values to a respective one of the plurality of scores and produces the aggregate score after having applied the weighting values to the plurality of scores for the aggregate of the plurality of scores.

9. The device of claim 8, further comprising a user interface to receive the plurality of weighting values.

10. The device of claim 7, further comprising a user interface to receive a definition of at least one of the metrics.

11. The device of claim 7, wherein a first one of the metrics corresponds to a number of open connections for the network session, a second one of the metrics corresponds to an average number of transactions per open connection, a third one of the metrics corresponds to a time distribution between requests during the network session, a fourth one of the metrics corresponds to an average server response time to the requests, a fifth one of the metrics corresponds to a percent of data objects of a web page that are requested for the network session, a sixth one of the metrics corresponds to link-following behavior during the network session, a seventh one of the metrics corresponds to changes to a user agent during the network session, an eighth one of the metrics corresponds to web page cookie handling behavior, and a ninth one of the metrics corresponds to an operating system used by the client device of the network session.

12. The device of claim 7, wherein the a programmed response executed by the attack detection module comprises at least one of sending an alert, dropping the packets of the network session, sending a close-session message to the client device of the network session, sending a close-session message to the server device of the network session, blocking connection requests from a network device of the network session, rate-limiting the network session, sending an identifier of the client device to a network device with instructions to block other network sessions of the client device, and sending an identifier of the server device to the network device with instructions to block network sessions of the server device.

13. The device of claim 7, further comprising a router, wherein a service plane of the router comprises an intrusion detection and prevention card that comprises the reassembly module, the bot detection module, and the attack detection module.

14. A non-transitory computer-readable medium comprising instructions for causing a programmable processor of a network device to:
   receive packets of a single network session comprising one or more connections between a single client device and a single server device;
   assemble network session data for the network session from the packets, the network session data comprising application-layer data and packet flow data for the network session;
   calculate a plurality of scores for the network session based on a plurality of metrics applied to the network session data, wherein each of the metrics corresponds to a characteristic of a network session originated by an automated software agent, and wherein each of the scores represents a likelihood that the network session is originated by an automated software agent;
   aggregate the plurality of scores to produce an aggregate score such that the aggregate score only reflects the plurality of metrics applied to the network session data for the single network session between the client device and the server device;
   determine that the network session is originated by an automated software agent when the aggregate score exceeds a threshold; and
   execute a programmed response when the network session is determined to be originated by an automated software agent.

15. The non-transitory computer-readable medium of claim 14, further comprising instructions to apply each of a plurality of weighting values to a respective one of the plurality of scores, wherein the instructions to aggregate the plurality of scores comprise instructions to aggregate the plurality of scores having the respective weighting values applied.

16. The non-transitory computer-readable medium of claim 15, further comprising instructions to present a user interface and to receive the plurality of weighting values via the user interface.

17. The non-transitory computer-readable medium of claim 14, further comprising instructions to present a user interface and to receive a definition of at least one of the metrics via the user interface.

18. The non-transitory computer-readable medium of claim 14, wherein a first one of the metrics corresponds to a number of open connections for the network session, a second one of the metrics corresponds to an average number of transactions per open connection, a third one of the metrics corresponds to a time distribution between requests during the network session, a fourth one of the metrics corresponds to an average server response time to the requests, a fifth one of the metrics corresponds to a percent of data objects of a web page that are requested for the network session, a sixth one of the metrics corresponds to link-following behavior during the network session, a seventh one of the metrics corresponds to changes to a user agent during the network session, an eighth one of the metrics corresponds to web page cookie handling behavior, and a ninth one of the metrics corresponds to an operating system used by the client device of the network session.

19. The non-transitory computer-readable medium of claim 14, wherein the instructions to execute a programmed response comprise at least one of instructions to send an alert, instructions to drop the packets of the network session, instructions to send a close-session message to the client device of the network session, instructions to block connection requests from a network device of the network session, instructions to send a close-session message to the server device of the network session, rate-limiting the network session, instructions to send an identifier of the client device to a network device with instructions to block other network sessions of the client device, and instructions to send an identifier of the server device to the network device with instructions to block network sessions of the server device.

* * * * *